United States Patent [19]

Utter

[11] 4,131,997
[45] Jan. 2, 1979

[54] VEGETATION CUTTING APPARATUS HAVING A SEMIAUTOMATICALLY DISPENSED FLEXIBLE LINE CUTTING ELEMENT

[76] Inventor: Gordon F. Utter, 32019 E. I-10, Redlands, Calif. 92373

[21] Appl. No.: 812,739

[22] Filed: Jul. 5, 1977

[51] Int. Cl.² ............................................. A01G 3/06
[52] U.S. Cl. ...................................... 30/276; 56/12.7
[58] Field of Search .................. 30/276, 347; 56/12.7, 56/295

[56] References Cited

U.S. PATENT DOCUMENTS

| 2,709,323 | 5/1955 | Swan | 51/335 |
| 2,771,721 | 11/1956 | Reiman | 51/335 |
| 2,854,798 | 10/1958 | De Haven | 51/335 |
| 3,928,911 | 12/1975 | Pittinger | 30/276 |

Primary Examiner—Jimmy C. Peters
Attorney, Agent, or Firm—Cushman, Darby & Cushman

[57] ABSTRACT

A spool carrying flexible cutting line is selectively engaged by a detent arrangement secured to a rotatable head assembly. A free end of the line passes through an opening in the assembly to permit vegetation to be cut during rotation of the head assembly. The spool normally rotates with the head assembly. When additional line from the spool is required, actuation of the detent arrangement releases the spool permitting relative rotation between the spool and the head, causing line to be dispensed from the spool.

5 Claims, 7 Drawing Figures

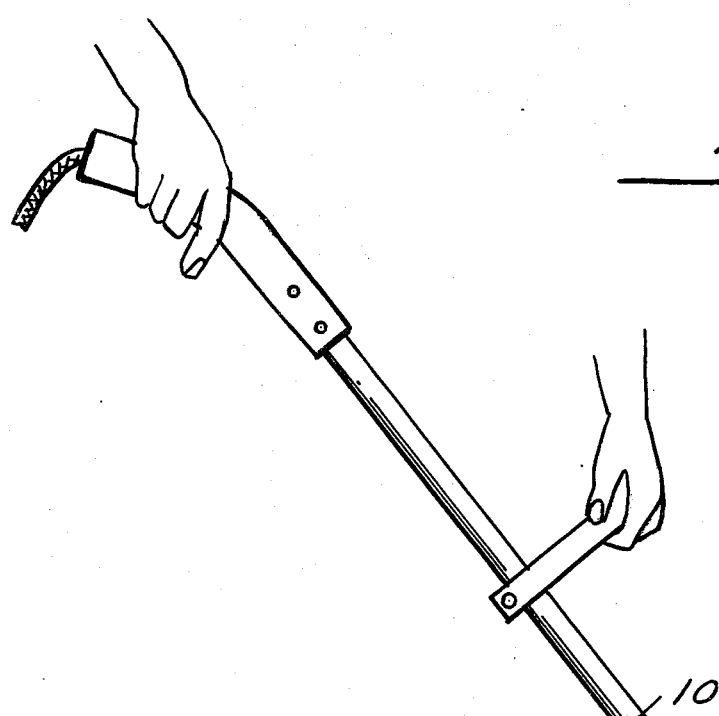
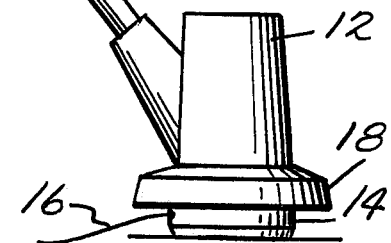
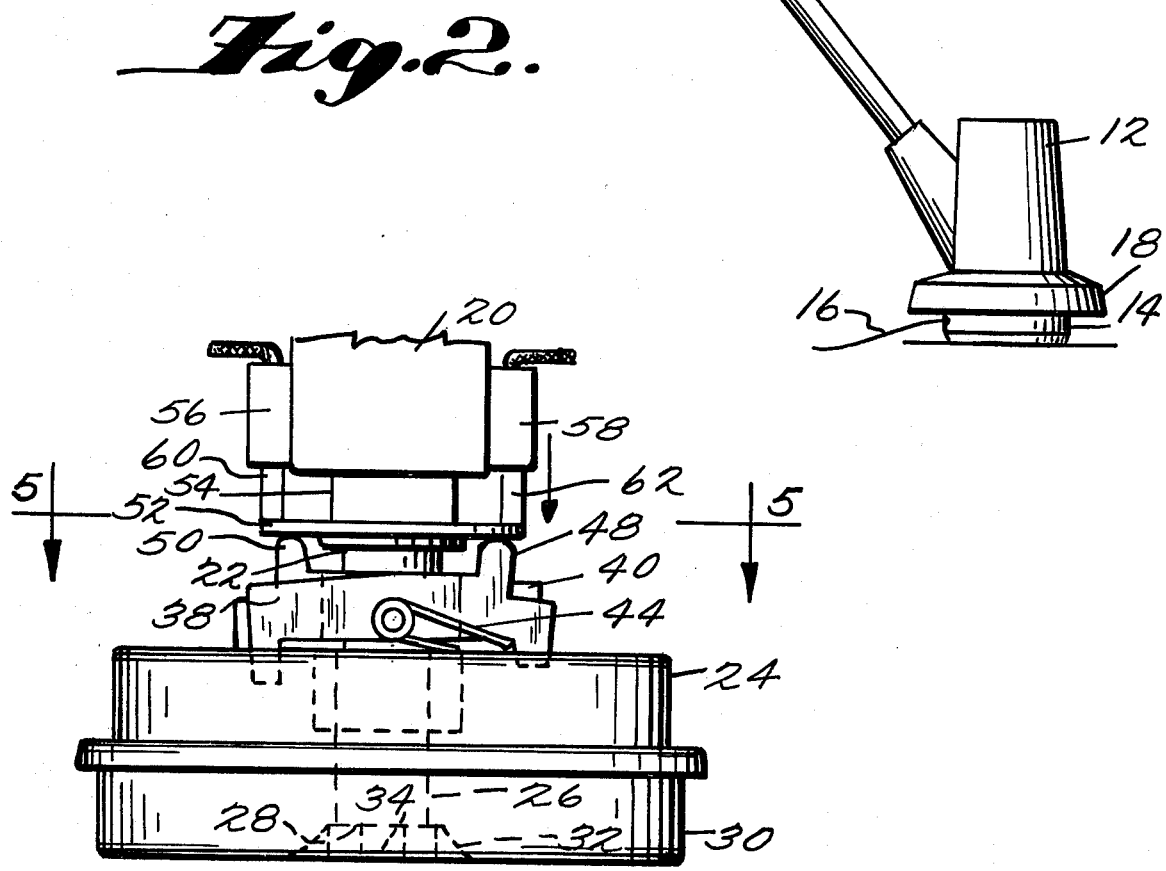

VEGETATION CUTTING APPARATUS HAVING A SEMIAUTOMATICALLY DISPENSED FLEXIBLE LINE CUTTING ELEMENT

BACKGROUND OF THE INVENTION

The present invention relates to vegetation cutting apparatus of the type disclosed in U.S. Pat. Nos. 3,826,068 and 3,859,776 issued to George C. Ballas and Thomas N. Geist. In general, this type of vegetation cutting apparatus comprises a rotatable head from which at least one length of flexible nonmetallic line extends. The line is supplied from a spool removably housed within the head, the line passing through an opening in the side of the head whereby as the latter rotates, the line extending therefrom engages and cuts vegetation.

An important consideration in effectively cutting vegetation is to maintain the proper length of line extending from the housing. During operation, the line is subjected to wear and damage. Accordingly, additional line must periodically be drawn from the spool.

In the arrangement disclosed in U.S. Pat. No. 3,859,776, the spool is locked with respect to the rotatable head. Therefore, in order to draw line from the spool, it is necessary either to (1) detach the spool from the head, release the desired length of line and then resecure the spool to the head; or (2) with the spool locked in place, grasp the free end of the line and pull additional line past the flange of the spool. These procedures are inconvenient and often wasteful.

In the arrangement of U.S. Pat. No. 3,826,068, line length can be adjusted without removing the spool, but this requires complex mechanical structure for dispensing the line in incremental lengths. Such an arrangement, as in the case of U.S. Pat. No. 3,859,776, requires that the cutting apparatus be shut off when the line length is to be adjusted.

In U.S. Pat. No. 4,007,525, issued to Gordon Francis Utter on Feb. 15, 1977, there is disclosed an improved, inexpensive arrangement which permits the proper length of cutting line to be dispensed from the spool in a simpler and more economic way than in U.S. Pat. Nos. 3,826,068 and 3,859,776. However, with this arrangement, it is also necessary for the cutting apparatus to be shut off when the length of line is to be adjusted.

SUMMARY OF THE INVENTION

It is the principal object of the present invention to provide an improved arrangement for dispensing the line from a spool in a vegetation cutting apparatus without shutting off the cutter. This is accomplished semiautomatically by providing a spool design which cooperates with an operator-actuated detent arrangement whereby when it is desired to increase the line length, the detent is actuated so as to release the spool from engagement with a rotating head assembly, allowing the flexible cutting line to feed from the spool. The detent is so arranged that the line is dispensed incrementally in relatively short lengths. Thus, the operator can repetitively cycle the detent arrangement until enough line is fed from the spool to optimize the cutting operation.

Details of the invention hereinafter will be described with reference to the accompanying drawings, wherein:

FIG. 1 is a side elevational view illustrating the principal operational components of the type of vegetation cutting apparatus for which the present invention is intended;

FIG. 2 is a side elevational view of a portion of the head structure of the vegetation cutting apparatus incorporating the present invention;

DETAILS OF THE INVENTION

Figure 6:
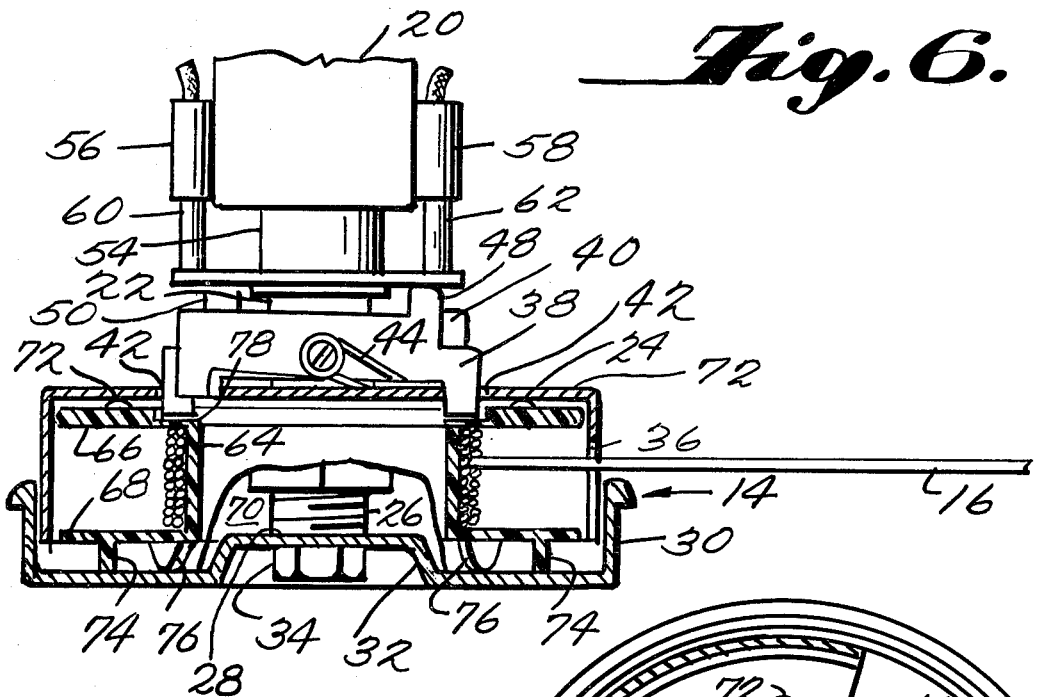
FIG. 6 is a view corresponding to that shown in FIG. 2 but partially fragmented and partially in section to illustrate the spool mounted within the head.

Referring to the drawings, FIG. 1 illustrates a vegetation cutting apparatus of the type with which the present invention is intended to operate. More particularly, a handle 10 is provided having at its lower end a housing 12 which contains a motor for rotating a vertically extending shaft within the housing. A head assembly 14 is secured to the shaft below the housing 12 so as to rotate when the shaft is driven by the motor. The head 14 receives a spool (which will hereinafter be described in detail) from which a flexible line 16 extends through an opening in the head. An annular protective member 18 is secured to housing 12 above the level of head 14. This line is preferably a synthetic such as nylon.

The motor within housing 12 is of the electric type, although it will be appreciated that vegetation cutting apparatus of the kind shown in FIG. 1 are also commercially available with gasoline-powered engines.

Figure 3:
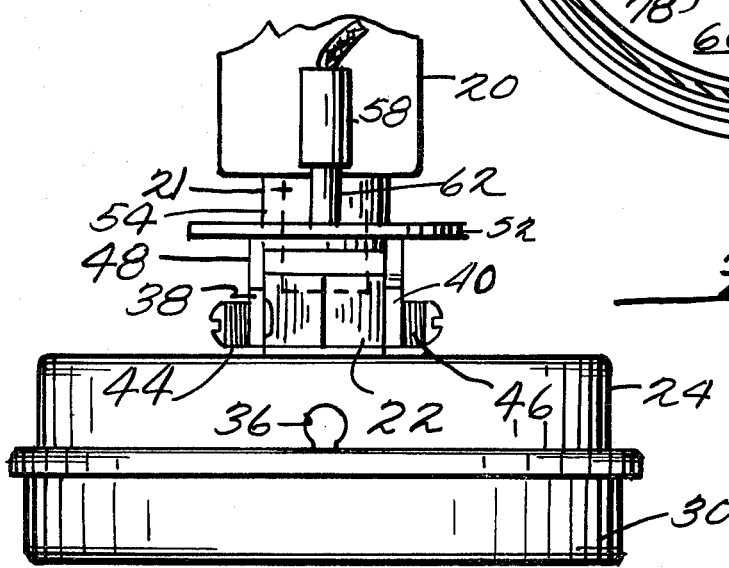
FIG. 3 is an end view of the arrangement shown in FIG. 2.
Figure 4:
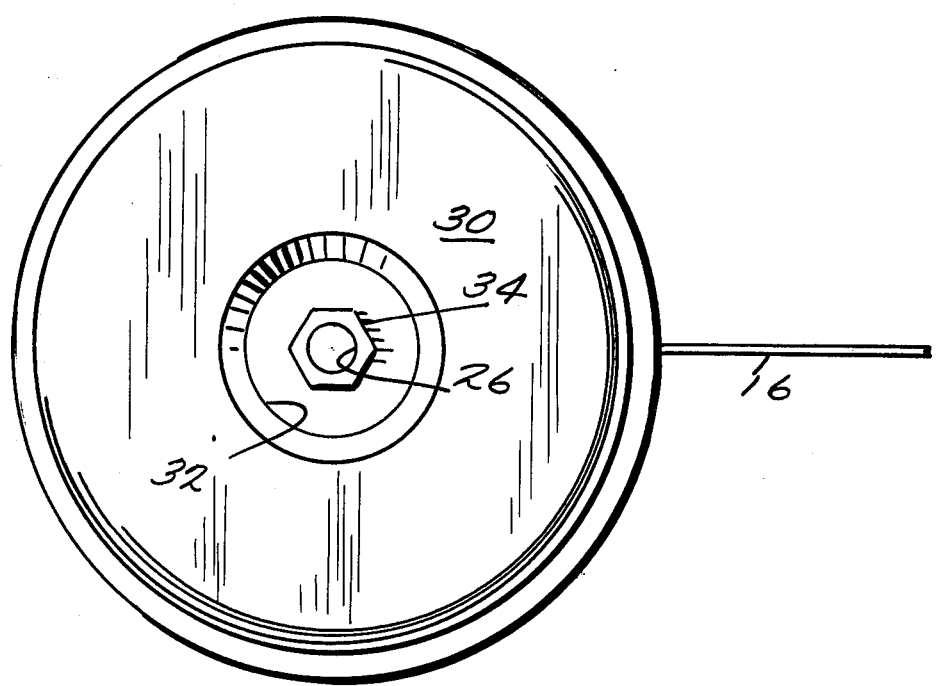
FIG. 4 is a bottom plan view of the arrangement shown in FIG. 2.

FIGS. 2–4 illustrate the arrangement by which the head assembly 14 is driven. More particularly, for convenience of illustration, the housing 12 and guard 18 are omitted in FIGS. 2 and 3 to expose the bottom portion of a motor 20. An output shaft 21 (FIG. 3) projects downwardly from the motor to be joined in conventional fashion to a boss 22 secured to the upper surface of an inverted cuplike head element 24. Consequently, on rotation of the motor output shaft, element 24 also rotates.

A threaded member 26 (see also FIG. 6) is secured at its upper end to the boss 22. The bottom portion of member 26 is of lesser diameter than the upper portion so as to define a shoulder 28 (FIG. 2) intermediate its ends. A second cup-like head element 30 oriented in an upright position is provided with a concavity 32 in its bottom wall and an aperture at the center of the cavity. When element 30 is slipped over the free end of threaded member 26, the element's bottom wall in the area of the cavity engages shoulder 28 whereby head elements 24 and 30 are accurately positioned with respect to one another. The side walls of element 30 slightly overlap the corresponding walls of head element 24 so as to define an enclosed chamber within the head elements for receiving a spool. The element 30 is secured to member 26 by a nut 34 whereby rotation of the motor shaft 21 also causes head element 30 to rotate with element 24.

A slotted aperture 36 is provided in the side wall of head element 24 for passage of the line 16 from a spool within the head elements to the exterior of the cutting apparatus. In the illustrative embodiment, a single flexible cutting line is employed, but it will be appreciated that plural lines may be employed with the addition of another aperture 36.

Still referring to FIGS. 2 and 3 (as well as to FIG. 6) a spool detent arrangement is provided on the upper surface of head element 24. More particularly, a pair of rocker arms 38 and 40 are pivotally joined intermediate their ends to boss 22. A downwardly extending projection is provided at each end of arms 38 and 40. These projections are positioned in alignment with corresponding apertures 42 in the upper wall of head element 24. Springs 44 and 46 are associated with arms 38 and 40 to urge the arms respectively in counterclockwise and clockwise directions, as viewed in FIGS. 2 and 6. Accordingly, the spring associated with each rocker arm normally positions one of the projecting ends of the respective arm in an extended position passing through its corresponding aperture 42, while retaining the opposite arm end in a retracted position. Each arm 38 and 40 is provided with an upwardly extending ear, designated as 48 and 50, respectively, located between the arm's pivotal connection with boss 22 and the normally retracted end of the arm. An annular plate 52 is positioned concentrically with the output shaft 21 of motor 20 and with a flanged bearing 54. The bearing permits shaft 21 to rotate with respect to plate 52. When the plate is moved along the axis of shaft 21 in the direction indicated by the arrowhead in FIG. 2 to the position shown in FIG. 6, the engagement of the plate 52 with ears 48 and 50 causes the arms 38 and 40 to be pivoted in opposition to springs 44 and 46 to reverse the positions of the projecting ends of each arm. That is, the end normally fully extended through apertures 42 is withdrawn, and the opposite end normally withdrawn is extended through its corresponding aperture 42.

In order to actuate plate 52 in accordance with the illustrative embodiment of the invention, a pair of solenoids 56 and 58 are secured to the exterior of motor 20. These solenoids are connected to an operator-controlled switch (not shown) in conventional fashion. The solenoids include projecting elements 60 and 62 which extend when the solenoids are energized to depress plate 52 against the resistance of springs 44 and 46. When the solenoids are de-energized, the springs assist in returning the plate, elements 60 and 62, and the arms 38 and 40 to the position shown in FIG. 2.

While the preferred embodiment of the invention employs a solenoid arrangement which is controlled by the actuation of a switch, it will be understood that plate 52 can be selectively displaced by other means, as for example, by a mechanical linkage from handle 10 of the cutting apparatus to the plate.

Figure 5:
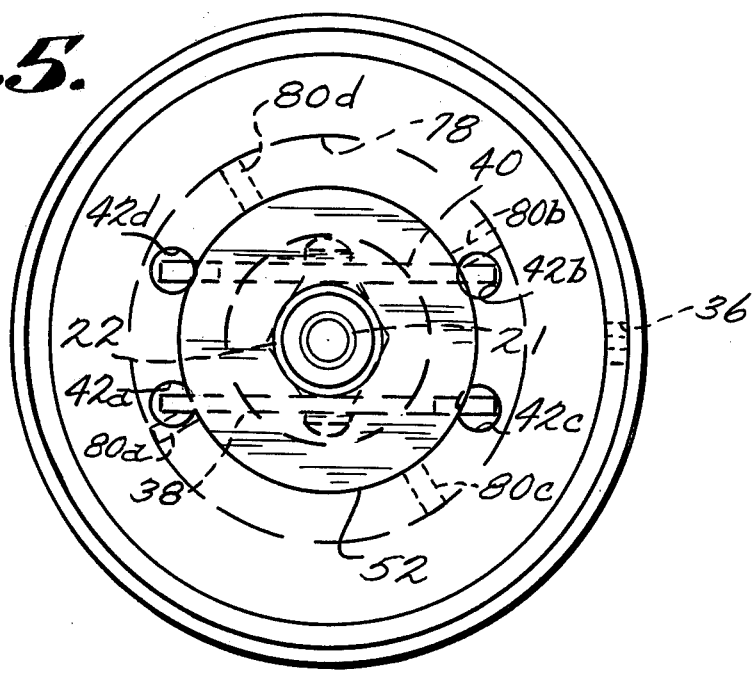
FIG. 5 is a sectional view taken along the lines 5—5 of FIG. 2.

Referring to FIG. 5, it can be seen that the arms 38 and 40 are disposed substantially parallel to one another. Therefore, with respect to the axis of the motor output shaft 21, the apertures 42a and 42b for receiving the normally fully extended projecting ends of arms 38 and 40 are displaced 180° from one another, while the apertures 42c and 42d (for receiving the projecting ends of arms 38 and 40 when plate 52 is depressed as in FIG. 6) also are displaced by 180° with respect to one another. The purpose of the arrangement now will be described with reference to FIGS. 6 and 7 which illustrate a spool positioned with the chamber defined by the head elements 24 and 30.

Figure 7:
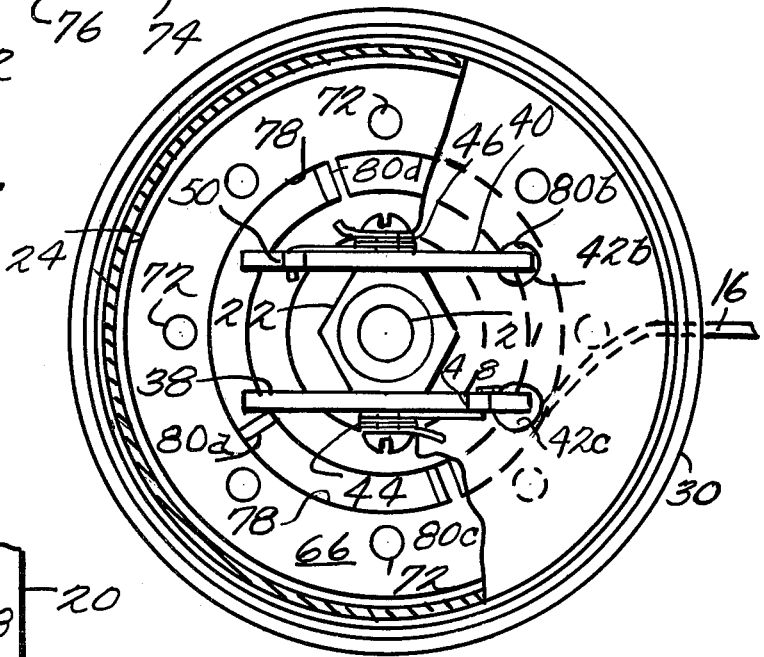
FIG. 7 is a view corresponding to that shown in FIG. 5 with plate 52 removed and being partially fragmented to illustrate the spool within the head.

The spool shown in FIGS. 6 and 7 is similar to that disclosed in the aforesaid U.S. Pat. No. 4,007,525. More particularly, the spool comprises a central support portion 64 having upper and lower flanges 66 and 68 at opposite ends thereof. The diameters of the flanges are slightly less than that of the chamber formed by head elements 24 and 30. The threaded member 26 projects through apertures 70 in the central portion of the spool. The upper flange 66 is provided with a plurality of projections 72 radially arranged on the flange's upper surface, while the lower flange 68 has integrally associated therewith a ring 74 which is concentric with the axis of aperture 70. Additional projections 76 are associated with ring 74 at 120° intervals so as to support the ring. When the head element 30 is held against shoulder 28 by nut 34 in the manner previously described, element 30 engages ring 74 and projections 76, thereby positioning the spool such that the upper projections 72 lightly engage the interior wall of head element 24. When the spool is so positioned, the head assembly 14 is capable of relative movement with respect to the spool except when the spool is engaged by the above-described detent arrangement in the manner now to be described.

The spool shown in FIGS. 6 and 7 differs from that disclosed in U.S. Pat. No. 4,007,525 by further including an annular recess 78 in the upper surface of flange 66. This recess is positioned immediately below the apertures 42 in head element 24. Accordingly, the fully extended projecting ends of the rocker arms 38 and 40 are received within recess 78. At radially spaced intervals within recess 78 stop elements are provided. In the illustrative embodiment of the invention, four such elements are disclosed, these being identified as 80a–80d, and each being radially oriented at 90° from its immediately adjacent stop element. The stop elements are dimensioned so as to permit contact with the fully extended projecting ends of the rocker arms 38 and 40.

With the arrangement just described, and with the head assembly rotating in a counterclockwise direction, as viewed in FIG. 7, the detent structure secured to head element 24 moves with respect to the spool until the fully extended projecting ends of rocker arms 38 and 40 engage stop elements 80a and 80b. Thereafter, the spool moves in conjunction with the head assembly, whereby the line 16 outside of the assembly is displaced, allowing vegetation to be cut. As line 16 wears and additional line is required to be fed from the spool in order to optimize cutting efficiency, the operator causes plate 52 to be depressed (in the manner previously described) so as to withdraw the projecting ends of rocker arms 38 and 40 from contacting relationship with stop elements 80a and 80b. This permits relative rotation between the head assembly and the spool, whereby the now fully extended opposite projecting ends of arms 38 and 40 advance to engage stop elements 80a and 80b temporarily terminating relative rotation between the head assembly and the spool. Upon release of the force depressing plate 52, the rocker arms under the influence of their springs 44 and 46 are restored to their original condition. As this occurs, contact with stop elements 80a and 80b terminates and again the head assembly moves relative to the spool until the fully extended projecting ends of arms 38 and 40 contact stop elements 80c and 80d, respectively.

The result of the cycle of operation just described is that the relative positions of the head assembly and the spool are adjusted by 90°. During the periods when the detent structure is not in contacting relationship with the stop elements of the spool, the movement of the head assembly with respect to the spool (as well as the effect of centrifugal force) cause an increment of line to be fed from the spool. By selectively repeating the cycle just described, the user can replace the line 16 which is lost to wear and breakage without interrupting the cutting operation.

Of course, if desired, the line 16 can be lengthened when the machine is off by depressing and releasing plate 52 while manually drawing line from the spool.

While the invention has been described using a single spool, it will be appreciated that the arrangement disclosed herein may also be adapted for use with multiple spools (of single or plural lines) stacked within the head assembly. It should also be understood that while the preferred embodiment of the invention disclosed hereinbefore utilizes a pair of rocker arms 38 and 40, the flexible line also can be properly dispensed if only a single rocker arm is employed. Furthermore, although four stop elements 78 are provided on the spool shown in FIGS. 6 and 7, a different number of stop elements can be utilized in a suitable spacing arrangement so as to allow a desired increment of line to be fed from the particular size spool being employed.

What is claimed is:

1. A vegetation cutting apparatus of the type having a rotatably driven head assembly housing a spool upon which a flexible line is wound, a free end of said line extending through an aperture in said assembly to engage vegetation when said assembly is rotated, said apparatus comprising:
   detent means secured to said head assembly, said detent means normally contacting first and second stop elements on said spool to cause the spool to rotate with the head assembly when said assembly is rotated, said detent means including:
   a first spring-loaded rocker arm pivotally mounted intermediate its ends and having one end portion normally biased by said spring to a position enabling contact with said first stop element and having its opposite end portion biased by said spring to a position preventing contact with said spool; and
   a second spring-loaded rocker arm pivotally mounted intermediate its ends and having one end portion normally biased by its spring to a position enabling contact with said second stop element and having its opposite end portion biased by its associated spring to a position preventing contact with said spool; and
   means for selectively actuating the detent means during rotation of the head assembly to release the spool from contacting relationship with the detent means thereby permitting limited relative rotation between the head assembly and the spool, said detent actuating means including:
   means selectively engaging the rocker arms to simultaneously pivot said arms in opposition to the forces of their respective springs to remove said one end portions of the arms form said contact-enabling positions and to move said opposite end portions into positions whereby the opposite end of said second rocker arm is enabled to contact the first-mentioned stop element and the opposite end of said first rocker arm is enabled to contact said second stop element whereby limited relative rotation of the head assembly and the spool is permitted.

2. A vegetation cutting apparatus as set forth in claim 1, wherein said detent means is selectively actuated by a solenoid.

3. A vegetation cutting apparatus as set forth in claim 1, further comprising:
   third and fourth stop elements positioned on said spool whereby on termination of actuation of said detent means and the return of said rocker arms to their normally biased positions, said one end portion of the first rocker arm is positioned to enable contact with said third stop element and said one end portion of the second rocker arm is positioned to enable contact with said fourth stop element whereby only limited relative rotation of the head assembly and the spool is permitted after termination of actuation of the detent means and wherein the total relative rotation between the head assembly and the spool as a result of a single cycle of actuating the detent means is less than one revolution.

4. A vegetation cutting apparatus as set forth in claim 1, wherein:
   said rocker arms are located on the exterior of said head assembly, said assembly being provided with apertures proximate the ends of said arms allowing passage of said ends to the interior of the assembly in accordance with the positions of said arms; and wherein:
   said stop elements on said spool are positioned to move into alignment with said apertures during relative rotation between the head assembly and the spool.

5. A vegetation cutting apparatus as set forth in claim 4, wherein said stop elements are positioned at radially spaced locations within an annular recess in said spool.

* * * * *